3,409,577
METHOD OF DETACKIFYING TACKY RESINS
Robert Wong, Newark, Ohio, and Philip W. Sullivan,
Heusy, Verviers, Belgium, assignors to Owens-Corning Fiberglas Corporation, Toledo, Ohio, a corporation of Delaware
No Drawing. Continuation-in-part of application Ser. No. 495,303, Oct. 12, 1965. This application July 6, 1966, Ser. No. 563,033
12 Claims. (Cl. 260—29.2)

This application is a continuation-in-part of application Ser. No. 495,303, filed Oct. 12, 1965, which is a continuation of application Ser. No. 213,136 filed July 30, 1962, both now abandoned.

The present invention relates to a new and improved method and means for reducing the tack of organo-resin forming materials; and particularly to a method and means for reducing the tack of resin forming coatings on glass fibers.

In the preparation of continuous fibrous glass elements for use in the reinforcement of synthetic resins, an aqueous forming size composition containing a resinous filmformer is applied to the surfaces of the fibers immediately subsequent to their formation by attenuation. During the preliminary processing of the fibrous glass elements, this composition serves as a protective coating which shields the fibers from the harmful effects of mutual abrasion and moisture attack. During advanced processing wherein the sized fibers are combined with a laminating or impregnating resin, the size composition must possess adequate compatibility with such resins to permit the wetting out of the fibers by these resins and sufficient glass to resin adhesion.

To achieve such compatibility in the case of fibers utilized in the reinforcement of unsaturated polyester resins, which comprises the major use for such products, it has been proposed to employ saturated polyesters as the film forming ingredient of the forming size composition. Such a coating would greatly improve both the rapidity and degree of wetting out of the fibers by the unsaturated polyester impregnants since the saturated polyesters exhibit a high degree of solubility in, and compatibility with such impregnants. Consequently, it would appear that forming size compositions containing a saturated polyester film-former would provide excellent reinforcing media for use with unsaturated polyester resins.

However, such is not the case. This situation arises from the tacky nature of the saturated polyesters and the consequent impediments to the satisfactory processing of fibers coated therewith. Such processing difficulties arise generally in the requisite winding of all fibrous strands coated with saturated polyesters, and are pronounced in the chopping of such strands for use as reinforcements, or in other processing which entails the contact of the tacky surfaced strand with contact points such as guide eyes, rollers, chopping blades and the like.

The tack problem in respect to the winding phase may be properly appreciated when it is realized that the glass fibers are formed at rates in excess of 10,000 feet per minute with the size composition applied between the fiber forming bushing and the collet upon which the fibers are wound. As a consequence of the rapid rates of fiber formation, adjacent turns of the fibrous strand are in contact with one another less than .005 second after the size composition is applied to the surface of the fibers. It is apparent that such a limited period does not permit adequate time for the drying or curing of the forming size composition and that any tackiness of the size composition would result in the inter adhesion or blocking of adjacent or contacting segments of the strand which is wound upon the collet or spool. Accordingly, the tacky nature of saturated polyesters has prevented their satisfactory utilization as an ingredient of forming size compositions.

This condition of tackiness is also of great significance in the subsequent processing of the fibrous glass strands, such as weaving, roving formation, and the like, wherein passage over contact points, guide eyes, and the like, is precluded or seriously deterred by such tackiness.

Still another impediment is realized in the chopping of fibrous glass rovings for the reinforcement of plastics. A specific example of such processing occurs in the case of the formation of reinforcing mats or preforms from chopped fibrous glass strands. In such a process the strand is chopped into short segments, each comprising a plurality of glass fibers and these segments are deposited upon a conveyor to be integrated by a subsequently applied binder. In such a process, if the size composition upon the strand is tacky, the strands adhere to the feed means and the chopping apparatus, and the chopped segments of strand adhere to one another to form clumps or aggregates and prevent the formation of a mat of uniform character.

This problem is multiplied in chopped roving products, such as those employed in spray-up applications. In such techniques, fibrous glass roving is fed into a gun which simultaneously chops the roving, and sprays it with an unsaturated polyester resin, upon a mold or forming surface. The rovings employed comprise a plurality of parallel strands, each of which comprises several hundred glass fibers. Ideally, upon chopping, the roving separates into the individual strands which each contain several hundred glass fibers. If the size composition is tacky the chopped strand segments tend to adhere to one another and to prevent a uniform distribution of these reinforcements. Instead, clumps or aggregates of inferior reinforcing properties are obtained and the strength properties of the ultimate laminate are consequently nonuniform.

Normally, the utilization of particulate fillers or antiblocking agents could be adopted in order to avoid the harmful incidents of the tacky surfaces. However, such expedients involve other detrimental factors in that the use of particulate de-tackifiers diminishes the protective qualities of the size composition, produces a condition conducive to moisture adsorption and generally reduces the quality of the laminate. For example, such material may not only render the size coating so friable as to render it inadequate to stem the harmful effects of mutual abrasion, but in addition may also increase abrasive attrition when the particles are of an adequate hardness. Still further, the size compositions are designed to transform the normally hydrophilic fibers to a hydrophobic condition. This is necessary since moisture intrusion acts to degrade both the fibers and the laminate, or the resin to fiber bond. When particulate anti-blocking agents are utilized they not only increase the permeability of the size coating, but in many instances they may demonstrate an adsorptive function.

An object of the present invention is the provision of a new and improved method and means for reducing the tack of normally tacky organic resinous or resin forming materials.

Another object of the present invention is the provision of a new and improved method for diminishing the tacky character of glass fibers coated with resinous size compositions.

A further object is the provision of a tack free size composition comprising a normally tacky synthetic resin and a tack modifying synthetic resin.

Another object is the provision of fibrous glass elements of diminished tack characteristics.

According to the invention, it has been discovered that the tackiness of normally tacky organic resinous or resin forming materials can be greatly reduced by the addition of from 1% to approximately 50% by weight of the detackifying agent hereinafter described. The precise reason why some materials are tacky and others are not, is not known, and in general the degree to which an organic material is tacky cannot be predicted from its formula. It has

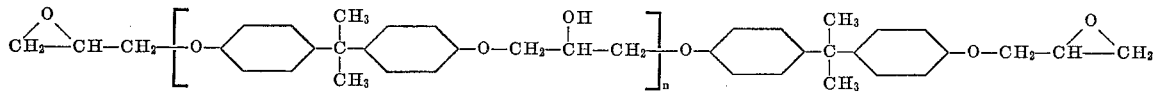

been found, however, that a minor amount of the detackifier later described, when added to normally tacky materials modify these normally tacky materials and reduce their tacky nature. It is believed that the detackifiers used in the present invention have one end which is non-tacky by reason of a particular type of detackifying group and that these materials adhere to the surface of tacky materials in an oriented manner with the non-tacky group projecting from and covering the surface of the normally tacky materials. Not only is it believed that the detackifying groups themselves are non-tacky, but that they hold water molecules in place on the surface of the normally tacky material, to in turn reduce the tacky nature of the tacky material. It has been found that the tack deterring materials of the invention are particularly effective, and are in the nature of a fugitive-detackifier which can be removed from the tacky material by another organic resin which is compatible with the tacky resinous material. The fugitive detackifier is floated free from the surface of the tacky resin by the other resin to thereafter float to the new surface and make it non-tacky. This, of course, has

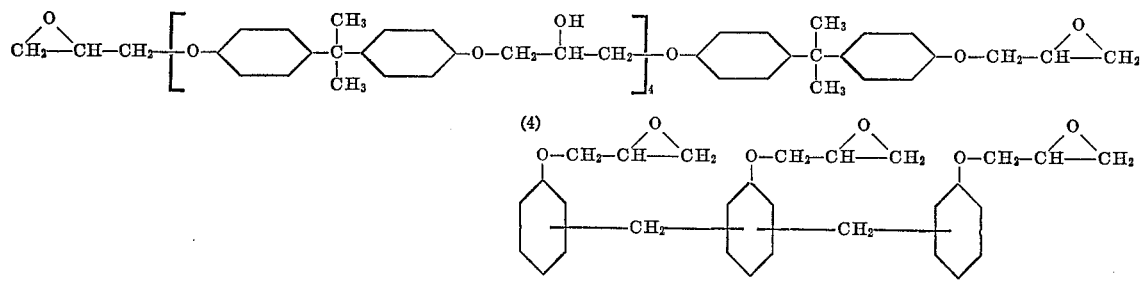

many advantages and makes the present invention unique relative to particulate detackifiers.

The detackifying agent used in the invention may be generally depicted by the following formula:

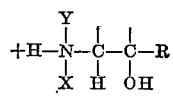

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and n is an integer of from 1 to 25, and R is a long chain organo molecule having a molecular weight up to approximately 10,000 and devoid of the terminal group given above at its other end.

Such materials may be made by acidifying the reaction product of a suitable amine and a molecule having at least one oxirane group thereon. Where oxirane groups exist at both ends of the molecule the reaction with the amine must be carried out under conditions which assure that only one oxirane group of each molecule is reacted with the amine.

Structural formulae of various types of epoxides which have been satisfactorily aminated and solubilized, are as follows:

(A) Glycidyl ethers of phenols:

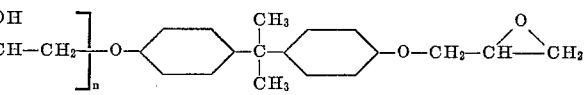

(B) Glycidyl ethers of phenol-aldehyde condensates:

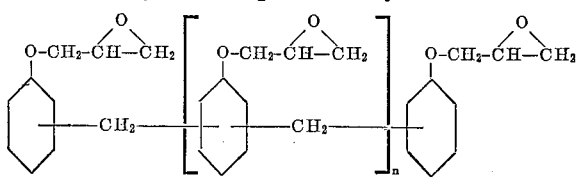

(C) Epoxodized polyalkadienes:

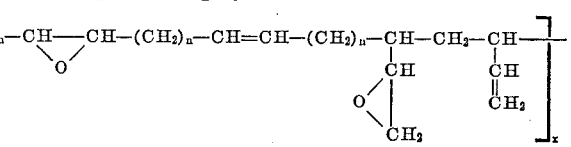

Specific compositions of the foregoing general types, include the following:

(1)

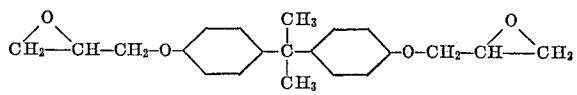

(2)

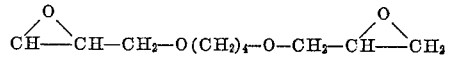

(3) [shown above]

(4)

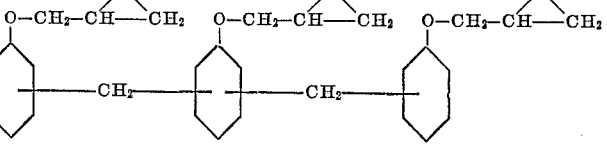

(5)

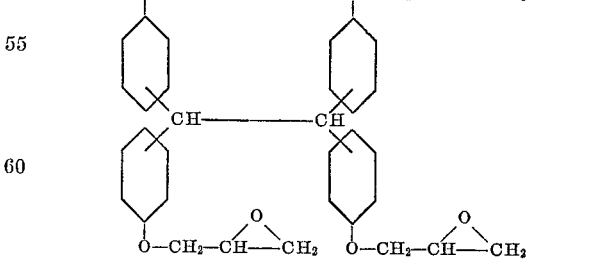

The amine compound which is reacted with the foregoing epoxy compounds may be described as a primary or secondary monoamine having at least one valence of the nitrogen atom satisfied by an aliphatic radical containing at least one hydroxy group, as is depicted by the following formula:

wherein H is hydrogen, R′ is an aliphatic hydrocarbon radical containing at least one hydroxy group, and R″ is hydrogen, an aliphatic hydrocarbon radical containing at least one hydroxy group, or an alkyl group having no more than 6 carbon atoms.

More specifically, the amine compound containing the aliphatic hydrocarbon radical, or radicals, having at least one hydroxy group, may be illustrated by the formula:

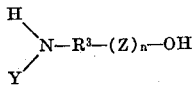

wherein $R^3$ is an aliphatic hydrocarbon radical having no more than 6 carbon atoms, and including:

(1) The alkanol and dialkanol amines, and their isomers, when $n$ is 0, e.g., ethanolamine, n-propanolamine, butanolamine, diethanolamine, methyl amino ethanol, ethyl amino ethanol, isopropanolamine, di(iso)propanolamine, 2-amino-1-butanol, and the like.

(2) Amino ethers and alkylene oxide condensates when Z is an ether group, e.g., —O—R— group with R being a divalent hydrocarbon radical having less than 6 carbon atoms, and $n$ having a value of less than 25, e.g., 2-amino ethyl, 2-hydroxy ethyl ether, polyoxyethylene amines, polyoxypropylene amines, and the like.

(3) Polyhydric alcohol condensates, hydroxy alkyl amines and amino alkanediols, when Z is an R—OH or R(OH) group, e.g., 1,2,3,4,5,6-hexahydroxy amine, tris(hydroxymethyl) amino-methane, 2-amino-2-methyl 1,3-propanediol, and the like.

Suitable amine reactants are set forth in Table I below:

TABLE I

| $\begin{array}{c} H \\ \diagdown \\ N-R-(Z)_n-OH \\ \diagup \\ Y \end{array}$ | | Representative Types of Compounds |
|---|---|---|
| (Z) | n | |
| | 0 | (a) Alkanolamines: Ethanolamine. n-Propanolamine butanolamine. (b) Alkyl Alkanolamines: Methyl amino ethanol. Ethyl amino ethanol. (c) Dialkanolamines: Diethanolamine. Di(iso)propanolamine. (d) Isomers: Isopropanolamine 2-amino-1-butanol. |
| —O—R— | 1-25 | (a) Amino Ethers: 2-amino ethyl, 2-hydroxy-ethyl ether. (b) Alkylene Oxide Condensates: Polyoxyethylene amine. Polyoxypropylene amine. |
| OH<br>\|<br>—R—<br>\|<br>H<br>or<br>OH<br>\|<br>—R—<br>\|<br>OH | 1 | (a) Polyhydric Alcohol Condensates: 1,2,3,4,5,6-hexahydroxy amine. (b) Hydroxy Amines: Tris(hydroxymethyl)aminomethane. 2-amino-2-methyl 1,3-propanediol. |

NOTES.—Y=Hydrogen, alkyl or one of the Z radicals; R=An aliphatic hydrocarbon radical having no more than 6 carbon atoms.

It has been found that by means of the addition of only a small portion of such fugitive detackifiers, size compositions formerly deemed unprocessable due to tackiness and consequent package bonding, and unsuitable for chopping, are transformed to a satisfactory condition.

To demonstrate the results achieved by the present invention, a small quantity of a water soluble detackifier was added to a size composition having notorious tack characteristics due to the presence of a saturated polyester component. Previously, strands and roving sized with the same composition, minus the epoxide, had proved entirely unsatisfactory for chopping processes such as the formation of chopped strand mat or spray-up applications. After modification in accordance with the invention, the sized fibers were readily chopped in both a mat forming and a spray-up operation.

The tacky polyester referred to is the saturated resin derived from the reaction of dihydric alcohols and dibasic acids or anhydrides. Such a resin is highly desirable due to its freedom from crosslinking and its solubility in and/or extreme compatibility with the unsaturated polyester resins which are conventionally employed in the impregnation of chopped strand mats, or in chopped roving spray-up applications. Such properties of the size composition make possible both the rapid and thorough wetting out or impregnation of the glass fibers by the unsaturated polyester impregnant. As a consequence, the resulting laminates possess better strengths, an improved appearance due to the diminution of interfacial divergencies, and a more favorable glass: resin reinforcement ratio due to the thoroughness of impregnation. However, as previously stated, the described saturated polyester resins are in fact liquids and display a pronounced degree of tackiness when embodied in size compositions, which renders them difficult to handle or unwind during the time in which they are in a package form, and unsuitable for chopping operations or for end usage as a chopped product. To remedy the latter defect, the additives of the present invention are more than satisfactory.

The saturated polyesters referred to are the reaction products of polyhydric alcohols such as the alkylene glycols, e.g. propylene, ethylene, butylene, octylene glycols and the like, the polyalkylene glycols such as diethylene, dipropylene, triethylene, and polyethylene glycols and the like, and polybasic acids such as succinic, phthalic, oxalic, malonic, glutaric, adipic, sebacic acid, and the like. Such resins are preferably prepared by heating the reactants in a closed container at temperatures in the range of 150 to 200° C. until such time as an acid number of approximately 20–40 is achieved. The reaction is facilitated by bubbling an inert gas such as nitrogen through the reaction medium. Alternatively, the inert gas may be replaced by a solvent system or reaction medium such as toluene.

A preferred saturated polyester comprises the reaction product of propylene glycol, succinic anhydride and phthalic anhydride prepared by placing 12.5 parts by weight of propylene glycol, 7.5 parts of succinic anhydride, 11.0 parts of phthalic anhydride and 0.02 part of triphenyl phosphite in a closed stainless steel container, maintaining the reaction mixture at 165° C. for around 8 hours, and then at 200° C. until an acid number of approximately 30 is obtained. The second phase of the reaction normally entails around 6 hours. Upon the attainment of the specified acid number, the reaction is stopped through the dilution of the product by the addition of a suitable solvent such as acetone, to provide a concentrated solution suitable for the formation of an aqueous dispersion.

A preferred epoxide detackifier may be prepared as follows:

EXAMPLE 1

To 371 parts by weight of diacetone alcohol were added 105 parts of diethanolamine and 371 parts of an epoxide having the formula:

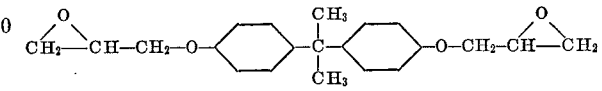

The mixture was agitated and maintained at 100° C. for a period of one hour. The resulting product comprised a pale yellow liquid which provided a clear, abrasion and moisture resistant film when cast upon a glass plate.

The reaction product is soluble in diacetone alcohol but if desired can be separated by distillation or extraction. When such separation is desired the product may be prepared in a medium in which it is insoluble, e.g., toluene, and water may be added subsequent to the reaction, and the product may then be removed upon phase separation.

To solubilize the reaction product, an organic or inorganic acid is added thereto until a pH slightly on the acid side is achieved. While acetic acid is preferred for this purpose, lactic, phosphoric, hydrochloric and sulfuric acids are suitable.

In preparing the prescribed, water soluble, epoxy resins, the epoxide reactant is any epoxide ether which possesses at least 2 oxirane groups. At least two such groups are necessary since at least one group must be retained to preserve the epoxide characteristics of the compound, while the other is expended in the reaction with the active hydrogen of the amine reactant. In accordance with this goal, the epoxide and amine reactants are employed in an equimolar ratio. It has been found that epoxides possessing 2 to 5 oxirane groups may be solubilized by the reaction of only one of these groups with an amine. While glycidyl ethers of phenols having the general formula: (A)

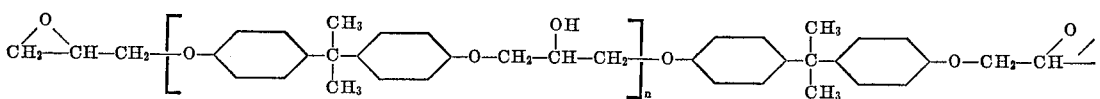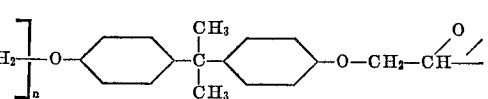

are preferred as the epoxide reactant, the novalac epoxides which have the general formula: (B)

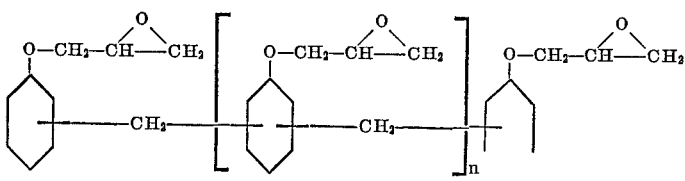

are also satisfactorily solubilized by the prescribed method.

The amine reactant is a primary or secondary monoamine having at least one valence of nitrogen satisfied by hydrogen, and at least one valence of nitrogen satisfied by an aliphatic hydroxy group. While dialkanolamines such as diethanolamine, di(iso)propanolamine, di-n-propanolamines, and the like, are preferred as amine reactants, the alkanolamines, e.g., ethanolamine, butanolamine, methyl amino ethanol, etc., amine ethers such as 2-amino ethyl 2-hydroxy ethyl ether, polyoxyethylene amines (terminal hydroxy), etc., and other hydroxy amines such as 1,2,3,4,5,6-hexahydroxy amine, tris (hydroxymethyl) aminomethane, and the like, are also suitable.

In compounding a size composition for use upon glass fibers to be employed in the reinforcement of an unsaturated polyester impregnant, it is highly desirable to add between 0.1 to 2% by weight of an organo-silane coupling agent to the size composition. Such coupling agents are believed to react with hydroxyl or silanol groups upon the glass surface and with unsaturated groups or double bonds present in the impregnating resin, to achieve a chemical linkage between the glass surface and the impregnating resin. These organosilanes comprise compositions having one or more hydrolyzable groups attached to silicon and one or more unsaturated or acyloxy groups, also attached to silicon, or the hydrolysis products of such compositions. Such organosilanes may be illustrated by the formula $R_nSiX_{4-n}$ wherein R is an unsaturated or acyloxy group such as an alkenyl group, e.g., vinyl, allyl, butenyl, etc.; an acyloxy group such as methacryloxy, methacryloxy propyl, etc.; X is a hydrolyzable or hydroxyl reactive group such as halogen, alkoxy, etc.; and $n$ is an integer having a value from 1 to 3. The coupling theory predicates that the hydrolyzable groups (X) or their hydrolysis products, i.e., hydroxyl groups, react with hydroxyl or silanol groups available upon the glass surface, while the unsaturated or acyloxy groups (R) react with the impregnating resin. For example the unsaturated group may engage in an addition polymerization with unsaturated groups in the impregnating resin, or the acyloxy groups may react or condense with carboxyl or hydroxyl groups present in the impregnating resin. Alternatively, the organosilanes may merely orient with the glass surface with the organic groups (R) outermost, to provide an interface which is compatible with the impregnating resin. At any rate the use of such compositions provides laminates having enhanced strength properties and they provide a further improvement in transforming the hydrophilic fiber surfaces to a hydrophobic condition.

In addition, if enhanced lubricity is desired, lubricants may be added to the size composition in quantities up to 2% by weight of the size composition. However, such compositions are not essential. While the condensates of fatty acids such as stearic and pelargonic acid, with amines such as tetraethylene pentamine are preferred lubricants, vegetable and animal oils may also be utilized.

EXAMPLE 2

A size composition which yields highly satisfactory reinforcing properties in laminates, comprises an aqueous dispersion of the following ingredients expressed in percentages by weight:

| | Percent |
|---|---|
| Saturated polyester resin (propylene glycol, succinic anhydride, phthalic anhydride reaction product previously described) | 4.4 |
| Gamma-methacryloxy propyl trimethoxy silane | 0.4 |
| Tetraethylene pentamine-stearic acid condensate | 0.14 |
| Water | Remainder |

However, despite the superior laminate properties achieved with glass fibers sized with the above composition, such products are plagued by a tackiness so extensive as to render them difficult to remove from a cylindrically wound package, and impossible to chop in mat forming or spray up applications.

EXAMPLE 3

To the composition of Example 2, were added 1.2 parts of the previously described solubilized epoxide of Example 1.

The resultant size composition was applied to glass fibers at forming by means of an apron applicator such as that disclosed by U.S. 2,873,718. The strands derived were devoid of discernible tackiness and were easily chopped in a mat forming process. A plurality of such strands were combined to form a roving which was then utilized in a spray-up gun which simultaneously chopped the roving and expelled the chopped segments together with an unsaturated polyester impregnating resin. The individual strand segments were readily dispersed, as opposed to clumping or aggregating, and the roving was easily chopped.

EXAMPLE 4

A size composition similar to that of Example 3, was prepared with an equal portion of a saturated polyester prepared from glutaric acid and equal parts of ethylene and diethylene glycol, substituted for the polyester of Example 2.

In addition, an equal quantity of vinyl tris beta (methoxy ethoxy) silane was substituted for the methacryloxy propyl trimethoxy silane.

Again, a satisfactory, processable and choppable product was derived.

In the compounding of the aforegoing compositions the organosilane may be admixed with the water with agitation for a period of no more than one half hour. A dispersion of the saturated polyester may then be added to the mixture and agitated. If a lubricant is employed, it may be added prior or subsequent to the addition of the polyester. The water soluble epoxide may be admixed with the polyester prior to its addition to the main mix, or it may be added separately, before or after the addition of the polyester.

After applying the size composition to the glass fibers, the wound package may be subjected to oven heating at temperatures from 200 to 300° F. for several hours, in order to facilitate the drying of the size composition.

In preparing laminates from the sized products of the invention, conventional methods and materials may be employed. For example, conventional unsaturated polyester-styrene systems may be employed as the impregnant and cured with heat and/or catalysts such as benzoyl peroxide.

The following examples indicate that any long chain molecule having a molecular weight of up to approximately 10,000 when having the detackifying group indicated above adjacent one end only of the molecule will, when added to tacky resinous material make the mixture generally non-tacky.

EXAMPLES 5–10

The mixing procedure given in Example 3 was repeated excepting that the respective material indicated below for each example was substituted for the solubilized epoxide of Example 1. In each instance, the aqueous composition when applied to the surface of a sheet of glass and dried thereon under ambient conditions, provided a coating which was generally non-tacky to the touch, and did not stick to one's finger when removed therefrom. Each composition when applied to glass fibers and coiled into a package can be easily unwound, and what is more, fibers coated therewith can be easily chopped into segments without clumping or aggregating.

EXAMPLE 9 wherein R is a ureaformaldehyde resinous condensate made by reacting 2.5 mol of formaldehyde with 1 mol of urea.

EXAMPLE 10 wherein "R" is the long chain molecule of a polyester exclusive of a carboxyl group and $R_1$ is a butyl group.

The following example indicates that a long chain molecule that does not contain the detackifying group above referred to will not when added to a tacky resin decrease the tackiness of the mixture.

EXAMPLE 11

The mixing procedure of Example 3 was repeated using a material having the following formula:

This mixture could not be solubilized in water and when applied to the surface of glass and allowed to remain until the water present disappeared, was tacky to the touch.

The following examples indicate that long chain molecules having the detackifying group above described adjacent one end only of the molecule, will render a mixture of any normally tacky resinous material mixed therewith, non-tacky.

EXAMPLE 12

The mixing procedure of Example 3 was repeated substituting a diepoxide having the formula given in Example 1 above for the saturated polyester resin. This aqueous composition when applied to the surface of a sheet of glass and allowed to dry thereon at ambient condition was generally non-tacky to the touch and will produce coated fibers which can be chopped satisfactorily.

EXAMPLE 13

The mixing procedure of Example 3 was repeated substituting a material having the fomula given in Example 1 for the saturated polyester resin, and a material of the formula given below for the solubilized reaction product of Example 1.

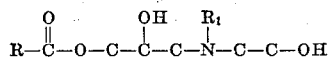

This material likewise when dried on the surface of glass, is generally non-tacky and when coated on glass fibers produces glass fibers which can be chopped satisfactorily.

EXAMPLE 14

The mixing procedure of Example 3 was repeated excepting that an unsaturated polyester resin formed by the reaction of equal molal quantities of maleic anhydride and propylene glycol, was substituted for the saturated polyester resin. This aqueous composition when applied to the surface of a sheet of glass and allowed to dry under ambient conditions is generally non-tacky to the touch and when applied to glass fibers produces coated fibers which can be chopped satisfactorily.

It is apparent that novel and improved size compositions and sized fibrous glass products, are provided by the present invention.

It is also obvious that various changes, alterations and substitutions may be made in the methods and materials of the present invention without departing from the spirit of the invention, as defined by the following claims.

We claim:

1. A method for improving the characteristics of size compositions for glass fibers which contain an aqueous dispersion of a tacky resin selected from the group consisting of polyester resins and epoxy resins, comprising: adding to said dispersion a quantity of detackifying agent equal to between 1 to 100% by weight of said tacky resin, said detackifying agent having the formula:

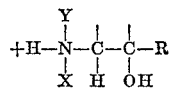

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —$(OR'')_nOH$, wherein R'' is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end.

2. A method as claimed in claim 1 in which R is $OR_1$ wherein $R_1$ is a polyhydric phenol.

3. A method as claimed in claim 1 in which R is $OR_1$ wherein $R_1$ is the condensation product of a phenol and an aldehyde.

4. A method for improving the characteristics of size compositions for glass fibers which contain an aqueous dispersion of a tacky saturated polyester, comprising: adding to said dispersion a quantity of a detackifying agent equal to between 1 to 100% by weight of said saturated polyester resin, said detackifying agent having the formula:

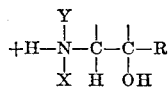

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —$(OR'')_nOH$, wherein R'' is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end.

5. Glass fibers coated with the dried residue of an aqueous dispersion consisting essentially of: between 1 to 7% by weight of a tacky synthetic resin selected from the group consisting of polyester resins and epoxy resins, between 0.1 to 5.25% by weight of a detackifying agent having the formula:

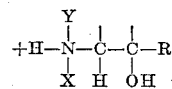

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —$(OR'')_nOH$, wherein R'' is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end, and between 0.1 to 2% by weight of an organo-silane having the formula:

$$R_nSiZ_{4-n}$$

wherein R is selected from the group consisting of alkenyl and acyloxy groups, Z is selected from the group consisting of halogen, alkoxy, and hydroxyl groups, and $n$ is an integer having a value from 1 to 3.

6. A coating composition consisting essentially of: between 50 to 99% by weight of a tacky synthetic resin selected from the group consisting of polyester resins and epoxy resins, between 1 to 50% of a detackifying agent having the following formula:

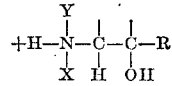

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —$(OR'')_nOH$, wherein R'' is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end, and between 0 and 10% by weight of an organo silane having the formula:

$$R_nSiZ_{4-n}$$

wherein R is selected from the group consisting of alkenyl and acyloxy groups, Z is selected from the group consisting of halogen, alkoxy and hydroxyl groups, and $n$ in an integer having a value from 1 to 3.

7. Glass fibers coated with the material of claim 6 in which R has the formula $OR_1$ wherein $R_1$ is a polyhydric phenol.

8. Glass fibers coated with the material of claim 6, in which R has the formula $OR_1$ wherein $R_1$ is a condensation product of a phenol and an aldehyde.

9. Glass fibers coated with the material of claim 6 in which said organo silane is gamma-methacryloxy propyl trimethoxy silane.

10. Glass fibers coated with material of claim 6 in which said organo silane is vinyl tris beta (methoxy ethoxy) silane.

11. The material of claim 6 in which X and Y are lower alkanol radicals.

12. The material of claim 11 in which R is a polyester group.

References Cited

UNITED STATES PATENTS

| | | | |
|---|---|---|---|
| 2,910,459 | 10/1959 | Rothrock et al. | 260—835 |
| 2,931,739 | 4/1960 | Marzocchi et al. | 117—126 |
| 3,027,341 | 3/1962 | Boucher et al. | 260—29.2 |
| 3,336,253 | 8/1967 | Wong et al. | 260—29.2 |

FOREIGN PATENTS

| | | |
|---|---|---|
| 229,422 | 8/1958 | Australia. |
| 559,545 | 7/1958 | Canada. |

MURRAY TILLMAN, *Primary Examiner.*

J. C. BLEUTGE, *Assistant Examiner.*